United States Patent
Stegmiller

(10) Patent No.: US 12,195,164 B2
(45) Date of Patent: Jan. 14, 2025

(54) IN-FLOOR ADAPTER FOR A CARGO DECK OF A CARGO HANDLING SYSTEM

(71) Applicant: GOODRICH CORPORATION, Charlotte, NC (US)

(72) Inventor: Wesley K. Stegmiller, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 505 days.

(21) Appl. No.: 17/485,101

(22) Filed: Sep. 24, 2021

(65) Prior Publication Data

US 2022/0144407 A1    May 12, 2022

Related U.S. Application Data

(60) Provisional application No. 63/111,371, filed on Nov. 9, 2020.

(51) Int. Cl.
| | | |
|---|---|---|
| B60P 7/06 | (2006.01) | |
| B60P 7/08 | (2006.01) | |
| B64C 1/20 | (2006.01) | |
| B64C 1/22 | (2006.01) | |
| B64D 9/00 | (2006.01) | |

(Continued)

(52) U.S. Cl.
CPC ............ B64C 1/22 (2013.01); B60P 7/06 (2013.01); B60P 7/08 (2013.01); B60P 7/0807 (2013.01); B64C 1/20 (2013.01); B64D 9/00 (2013.01); B64D 9/003 (2013.01); B64D 11/06 (2013.01); B64D 11/0696 (2013.01); B64F 5/10 (2017.01); B65G 67/00 (2013.01)

(58) Field of Classification Search
CPC .... B64C 1/18; B64C 1/20; B64C 1/22; B64D 9/003; B64D 11/0696; B60P 7/0807; B60P 7/06; B60P 7/08; B61D 45/001; B65D 19/00; B65D 19/38
USPC .......... 410/77, 80, 106, 109, 110, 112, 116; 248/499, 503

See application file for complete search history.

(56) References Cited

U.S. PATENT DOCUMENTS 2,664,611 A *  1/1954  Shomber ................... F16B 5/10
                                                      24/642
2,786,428 A *  3/1957  Arnold .................... B64D 9/003
                                                      410/116

(Continued)

FOREIGN PATENT DOCUMENTS

| EP | 3348469 | 7/2018 |
|---|---|---|
| WO | 2005012082 | 2/2005 |
| WO | 20160157081 | 10/2016 |

OTHER PUBLICATIONS

European Patent Office; European Search Report dated Mar. 25, 2022 in Application No. 21206977.7.

Primary Examiner — Christopher D Hutchens
Assistant Examiner — Michael A. Fabula
(74) Attorney, Agent, or Firm — SNELL & WILMER L.L.P.

(57) ABSTRACT

An in-floor adapter for a cargo deck of a cargo handling system may comprise: a plate extending from a proximal end to a distal end; a pocket disposed in the plate, the pocket having a sidewall and a bottom wall; a fitting disposed in the pocket, the fitting configured to mount a leg of a seat; and a slot disposed through the plate, the slot configured to guide an attachment mechanism during installation of the in-floor adapter in the cargo deck.

3 Claims, 8 Drawing Sheets

(51) Int. Cl.
  *B64D 11/06* (2006.01)
  *B64F 5/10* (2017.01)
  *B65G 67/00* (2006.01)

(56) References Cited

U.S. PATENT DOCUMENTS

| | | | | |
|---|---|---|---|---|
| 3,241,501 | A * | 3/1966 | Watts | B60P 7/0815 |
| | | | | 410/105 |
| 3,486,204 | A * | 12/1969 | Miller, Jr. | A47C 7/002 |
| | | | | 248/501 |
| 3,693,919 | A * | 9/1972 | Alberti | B64D 9/003 |
| | | | | 410/92 |
| 4,000,870 | A * | 1/1977 | Davies | B64C 1/20 |
| | | | | 410/94 |
| 4,077,590 | A * | 3/1978 | Shorey | B64D 9/003 |
| | | | | 414/532 |
| 5,383,630 | A | 1/1995 | Flatten | |
| 5,823,724 | A * | 10/1998 | Lee | B60P 7/0815 |
| | | | | 410/112 |
| 5,871,318 | A * | 2/1999 | Dixon | B60N 2/01558 |
| | | | | 410/104 |
| 5,927,650 | A * | 7/1999 | Huber | B64D 1/10 |
| | | | | 414/532 |
| 6,039,519 | A * | 3/2000 | Jones | B64D 9/00 |
| | | | | 410/80 |
| 6,302,358 | B1 | 10/2001 | Emsters et al. | |
| 6,729,818 | B1 * | 5/2004 | Yee | B60P 7/0892 |
| | | | | 410/80 |
| 6,817,578 | B1 | 11/2004 | Garcia et al. | |
| 7,344,013 | B2 * | 3/2008 | Krueger | B65G 13/12 |
| | | | | 414/533 |
| 8,128,326 | B2 * | 3/2012 | Hudson | B64D 11/0696 |
| | | | | 410/104 |
| 8,668,181 | B2 * | 3/2014 | Dazet | B60P 7/0807 |
| | | | | 248/500 |
| 9,132,907 | B2 | 9/2015 | Huber | |
| 2005/0072897 | A1 * | 4/2005 | Fanucci | B63B 29/06 |
| | | | | 248/680 |
| 2005/0224645 | A1 | 10/2005 | Huber | |
| 2007/0193146 | A1 | 8/2007 | Carstensen et al. | |
| 2010/0116933 | A1 * | 5/2010 | Erickson | B64D 11/0696 |
| | | | | 248/503.1 |
| 2010/0314495 | A1 * | 12/2010 | Dazet | B64D 11/0696 |
| | | | | 244/131 |
| 2017/0209318 | A1 * | 7/2017 | Schroeder | F16M 13/022 |
| 2017/0259924 | A1 * | 9/2017 | Olulana | B64D 11/0696 |
| 2018/0194451 | A1 * | 7/2018 | Cosby | B64C 1/22 |
| 2018/0194473 | A1 * | 7/2018 | Emrich | B64D 25/04 |
| 2018/0194478 | A1 * | 7/2018 | Carr | B64C 1/18 |
| 2018/0222677 | A1 * | 8/2018 | Chitragar | B65G 39/025 |
| 2019/0248499 | A1 * | 8/2019 | Grether | B64C 1/20 |
| 2019/0367149 | A1 * | 12/2019 | Leachman | F16B 37/14 |

\* cited by examiner

SECT A-A

SECT B-B

IN-FLOOR ADAPTER FOR A CARGO DECK OF A CARGO HANDLING SYSTEM

CROSS-REFERENCE TO RELATED APPLICATIONS

This application claims priority to, and the benefit of, U.S. Provisional application Ser. No. 63/111,371, filed Nov. 9, 2020 and titled "CARGO HANDLING SYSTEM," which is incorporated by reference herein in its entirety for all purposes. FIELD The present disclosure relates to cargo handling systems, and more particularly, to a reversable cargo handling system configurable for transportation of people and transportation of cargo.

BACKGROUND

Aircrafts configurable for transportation of people may be configurable to transport cargo as well. To reconfigure an aircraft configured to transport people for cargo, all the seats are removed, and roller trays and other cargo handling components are installed. This process can be time consuming and costly.

SUMMARY

An in-floor adapter for a cargo deck of a cargo handling system is disclosed herein. The in-floor adapter may comprise: a plate extending from a proximal end to a distal end; a pocket disposed in the plate, the pocket having a sidewall and a bottom wall; a fitting disposed in the pocket, the fitting configured to mount a leg of a seat; and a slot disposed through the plate, the slot configured to guide an attachment mechanism during installation of the in-floor adapter in the cargo deck.

In various embodiments, the in-floor adapter further comprises the attachment mechanism, the attachment mechanism configured to engage the cargo deck. The attachment mechanism may comprise a first spring-loaded plunger. The attachment mechanism may further comprise a second spring loaded plunger, the first spring loaded plunger disposed proximate the proximal end of the plate, the second spring loaded plunger disposed proximate the distal end of the plate. The attachment mechanism may further comprise a bar extending from the first spring loaded plunger to the second spring loaded plunger. The in-floor adapter may further comprise an aperture disposed through the bar, the aperture aligned with the slot. The in-floor adapter may further comprise a first rail extending orthogonally from the plate on a first side of the plate from the proximal end to the distal end, a second rail extending orthogonally from the plate on a second side of the plate opposite the first side and extending from the proximal end to the distal end, and a plurality of rollers disposed between the first rail and the second rail and spaced apart along a length of the first rail and the second rail.

A system is disclosed herein. The system may comprise: a cargo deck of an aircraft; a first row of seats disposed on a first side of the cargo deck and spaced apart in a forward direction of the cargo deck; a second row of seats disposed on a second side of the cargo deck and spaced apart in the forward direction of the cargo deck; a third row of seats disposed between the first row of seats and the second row of seats and spaced apart in the forward direction of the cargo deck; a first row of fittings, each fitting in the first row of fittings fixedly coupled to the cargo deck, each seat in the first row of seats fixedly mounted to at least one fitting in the first row of fittings; a second row of fittings, each fitting in the second row of fittings fixedly coupled to the cargo deck, each seat in the second row of seats fixedly mounted to at least one fitting in the second row of fittings; a third row of fittings, each fitting in the third row of fittings fixedly coupled to the cargo deck, each seat in the third row of seats fixedly mounted to at least one fitting in the third row of fittings; and a fourth row of fittings including a set of integral fittings and a set of adapter fittings, each fitting in the set of integral fittings fixedly coupled to the cargo deck, each fitting in the set of adapter fittings coupled to a respective in-floor adapter, the in-floor adapter coupled to the cargo deck and comprising: a plate extending from a proximal end to a distal end; at least one adapter fitting in the set of adapter fittings coupled to the plate.

In various embodiments, the in-floor adapter may further comprise an attachment mechanism configured to couple the in-floor adapter to the cargo deck. The system may further comprise a plurality of rollers disposed opposite a flat surface of the plate, the plurality of rollers disposed proximate a cavity defined by the cargo deck. The in-floor adapter may further comprise a first plunger, the first plunger coupled to the cargo deck. The in-floor adapter may further comprise a second plunger, the second plunger coupled to the cargo deck. The set of adapters may be spaced apart in the forward direction along the cargo deck. The set of adapters may be removably coupled to the cargo deck.

A method of converting a reconfigurable cargo handling system from a cargo handling configuration to a transportation of people configuration is disclosed herein. The method may comprise: decoupling a plurality of roller trays from a cargo deck; coupling a plurality of adapters to the cargo deck, the plurality of adapters disposed on the cargo deck where the plurality of roller trays were previously disposed, the plurality of adapters including a set of adapters, each adapter in the set of adapters comprising a plate and a fitting coupled to the plate; and mounting a plurality of seats to the cargo deck, each seat comprising a plurality of legs, a first set of legs in the plurality of legs mounted to a respective fitting of a respective adapter in the set of adapters, a second set of legs in the plurality of legs mounted to an integral fitting of the cargo deck.

In various embodiments, a set of roller trays in the plurality of roller trays is the set of adapters in the plurality of adapters. The plurality of seats may include a first row of seats disposed on a first side of the cargo deck, a second row of seats disposed on a second side of the cargo deck, and a third row of seats disposed between the first row of seats and the second row of seats. The third row of seats may include the first set of legs in the plurality of legs. Each adapter in the set of adapters may comprise a first spring loaded plunger configured to engage the cargo deck. Each adapter in the set of adapters may comprise a second spring loaded plunger configured to engage the cargo deck.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact.

Disclosed herein is a reconfigurable cargo handling system. The reconfigurable cargo handling system may include an in-floor adapter with a seat mount fitting. The in-floor adapter may be configured to replace a roller tray of a cargo handling system. In doing so, the in-floor adapter may be configured to convert a cargo handling system to a transport system for people. In various embodiments, the seat mount fitting may be configured to attach a seat to the in-floor adapter. In various embodiments, the in-floor adapter may be configurable to couple to a cargo deck of a cargo handling system. In this regard, the cargo handling system may be reconfigurable to include an extra row of seats for transportation of people, in accordance with various embodiments.

Figure 1:
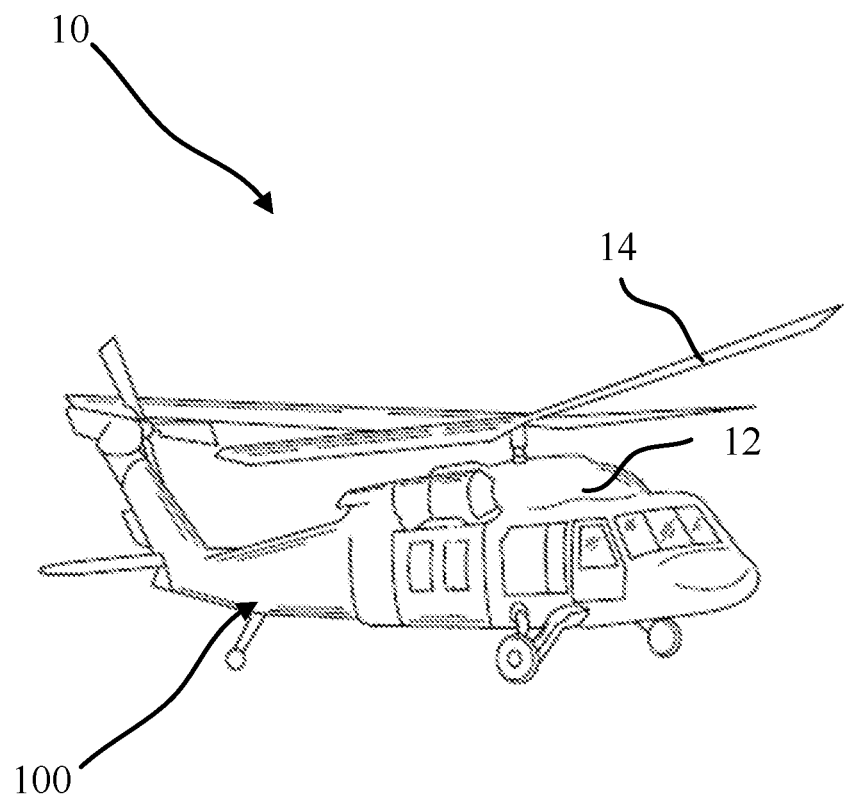
FIG. 1 illustrates a plain view showing an aircraft with a reconfigurable cargo handling system, in accordance with various embodiments.
Figure 1:
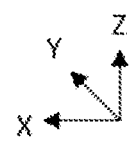

Referring now to FIG. 1, an aircraft (e.g., a helicopter 10) with a reconfigurable cargo handling system 100 is illustrated, in accordance with various embodiments, is illustrated. The helicopter 10 includes an airframe 12 mechanically coupled to a main rotor 14. Main rotor 14 may include a plurality of rotary blades. In various embodiments, the reconfigurable cargo handling system 100 may be disposed at an aft end of the airframe 12.

Figure 2:
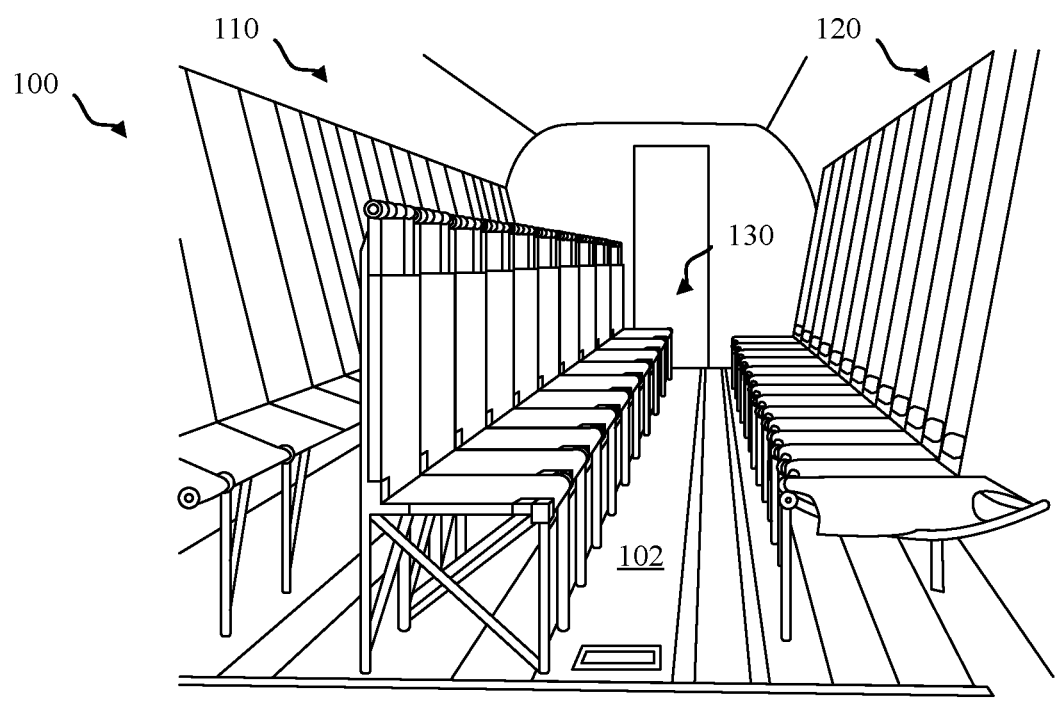
FIG. 2 illustrates a perspective view of a portion of a reconfigurable cargo handling system, in accordance with various embodiments.

Referring now to FIG. 2, the reconfigurable cargo handling system 100 from FIG. 1 in a configuration for transportation of people, in accordance with various embodiments, is illustrated. In various embodiments where the reconfigurable cargo handling system 100 is in the configuration for transportation of people, the reconfigurable cargo handling system 100 comprises a first row of seats 110, a second row of seats 120, and a third row of seats 130. Each row of seats 110, 120, 130 may be removably coupled to a cargo deck. For example, each leg of each seat in the rows of seats 110, 120, 130 are mounted to the cargo deck via a fitting. In various embodiments, the fitting is either integral to the cargo deck 102, or integral to an in-floor adapter, as described further herein.

Figure 3:
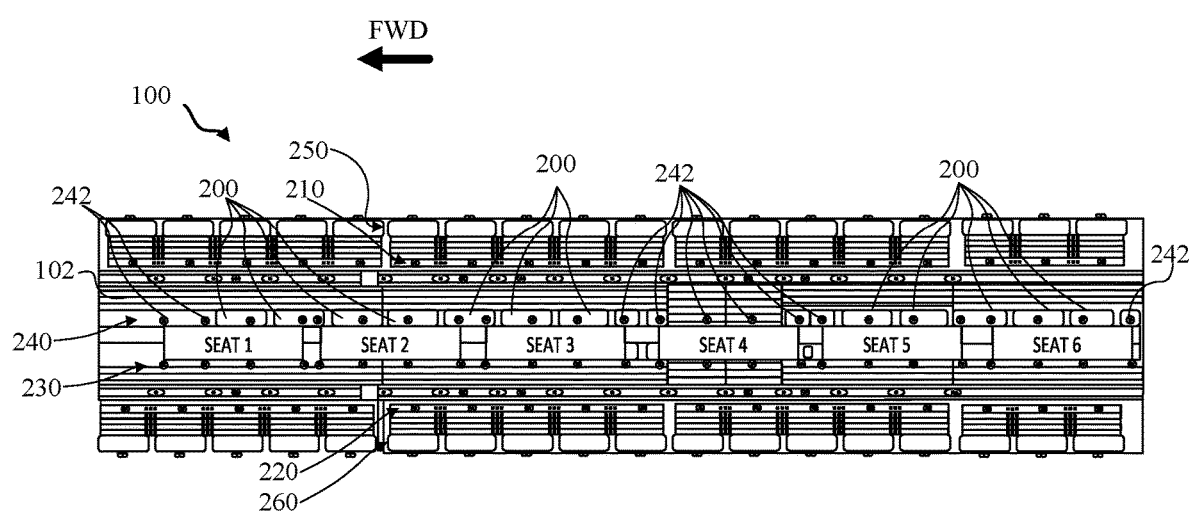
FIG. 3 illustrates a schematic view of a reconfigurable cargo handling system, in accordance with various embodiments.

Referring now to FIG. 3, a schematic view of a reconfigurable cargo handling system 100 in a configuration for transportation of people with the first row of seats 110 and second row of seats 120 from FIG. 2 removed for clarity is illustrated, in accordance with various embodiments. In various embodiments, the reconfigurable cargo handling system includes a first row of adapters 250 disposed on a first side of the cargo deck 102 spaced apart in a forward (FWD) direction along the cargo deck. Similarly, in various embodiments, the reconfigurable cargo handling system 100 includes a second row of adapters 260 disposed on a second side of the cargo deck 102 and spaced apart in the forward direction. In various embodiments, each adapter in the row of adapters 250, 260 may be a tray reconfigured to form a roller tray in a cargo handling configuration. In various embodiments, each adapter in the row of adapters 250, 260 may replace a roller tray in a cargo handling configuration. In various embodiments, by having each adapter in the row of adapters 250, 260 replace a roller tray in a cargo handling configuration, the configuration for carrying people of the reconfigurable cargo handling system 100 may be lighter and/or provide a performance benefit of the helicopter 10 from FIG. 1.

In various embodiments, the reconfigurable cargo handling system 100 includes a first row of fittings 210, a second row of fittings 220, a third row of fittings 230, and a fourth row of fittings 240. Each fitting in the row of fittings 210, 220, 230, 240 are configured to mount to a leg of a seat in the row of seats 110, 120, 130 from FIG. 2. In various embodiments, the first row of fittings 210 are spaced apart in the forward (FWD) direction along the cargo deck 102. Similarly, the second row of fittings 220, the third row of fittings 230, and the fourth row of fittings 240 are spaced apart in the forward (FWD) direction along the cargo deck 102.

In various embodiments, the first row of fittings 210, the second row of fittings 220, and the third row of fittings 230 are integral with the cargo deck 102. In this regard, in accordance with various embodiments, each fitting in the first row of fittings 210, the second row of fittings 220, and the third row of fittings 230 are fixedly attached to the cargo deck 102 in both a cargo handling configuration and a configuration for transporting people. In various embodiments, the fourth row of fittings 240 include a first set of fittings 242 that are integral to the cargo deck 102 in a manner similar to the first row of fittings 210, the second row of fittings 220, and the third row of fittings 230. In various embodiments, the remaining fittings in the fourth row of fittings 240 may be components of a respective adapter in a plurality of an in-floor adapter 200 as described further herein. In various embodiments, each adapter in the plurality of the in-floor adapter 200 includes at least one fitting in the fourth row of fittings 240.

Figure 4:
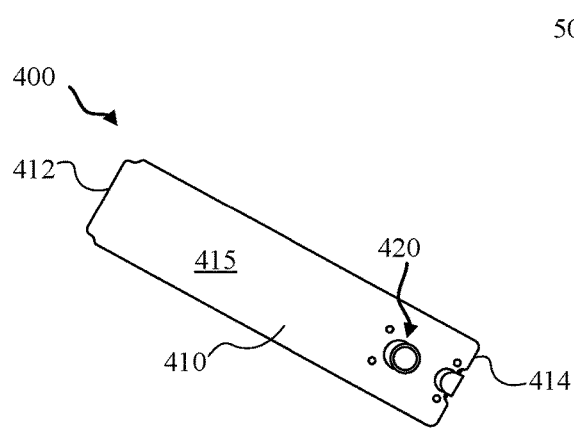
FIG. 4 illustrates an adapter for use in a reconfigurable cargo handling system, in accordance with various embodiments.

Referring now to FIG. 4, an adapter 400 in the first row of adapters 250 and the second row of adapters 260 is illustrated, in accordance with various embodiments. In various embodiments, the adapter 400 comprises a plate 410 extending from a proximal end 412 to a distal end 414. The plate 410 may define a flat surface 415. In various embodiments, an attachment mechanism 420 is mounted to the plate 410. Although the attachment mechanism 420 is illustrated as a spring-loaded plunger configured to engage the cargo deck 102 from FIGS. 2 and 3, any attachment mechanism known in the art may be utilized, such as a hook and lever, a gear coupling, a worm screw coupling, a fastener coupling, or the like. In various embodiments, the adapter 400 is configured to replace a roller tray from a cargo handling configuration to convert the cargo deck to a configuration for transporting people, as described further herein. In various embodiments where the cargo deck 102 is in a configuration for transportation of people, the plate 410 forms a substantially flat surface with the cargo deck 102.

Figure 5:
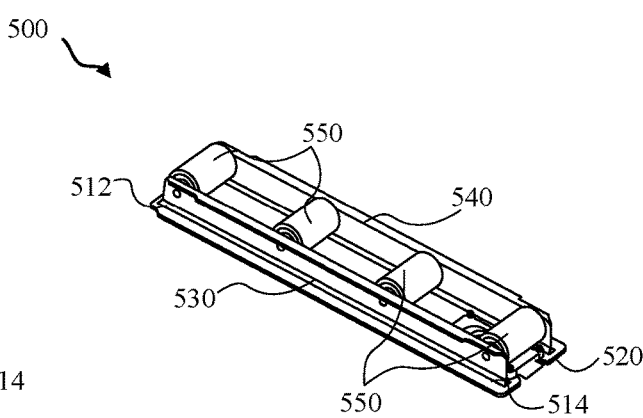
FIG. 5 illustrates a tray for use in a reconfigurable cargo handling system, in accordance with various embodiments.

Referring now to FIG. 5, a tray 500 configurable to replace the first row of adapters 250 and the second row of adapters 260 to form a cargo handling configuration of the reconfigurable cargo handling system 100 from FIGS. 2 and 3 is illustrated, in accordance with various embodiments. In various embodiments, the tray 500 comprises a plate 510 extending from a proximal end 512 to a distal end 514. In various embodiments, an attachment mechanism 520 is mounted to the plate 510. In various embodiments, the tray 500 includes a first rail 530 and a second rail 540 each extending orthogonal to the plate 510. The first rail 530 may be disposed on an opposite side of the second rail 540. In various embodiments, the tray 500 includes a plurality of rollers 550. Each roller in the plurality of rollers 550 extend from the first rail 530 to the second rail 540 and are spaced apart from the proximal end 512 to the distal end 514 of the plate 510.

With combined reference to FIGS. 3 and 5, the plurality of rollers 550 extend above the cargo deck 102 and are configured to facilitate movement of cargo in a forward or aft direction along the cargo deck 102. In this regard, each adapter in the rows of adapters 250, 260 may be replaced with the tray 500 to form a cargo handling configuration of the cargo deck 102.

In various embodiments, the adapter 400 and the tray 500 may be made in combination. For example, plate 410 may be in accordance with plate 510, in accordance with various embodiments, and the flat surface 415 of the plate 410 may face into the cargo compartment when in a configuration for transportation of people, and the plurality of rollers 560 may face into the cargo compartment when in a cargo handling configuration.

Figure 6:
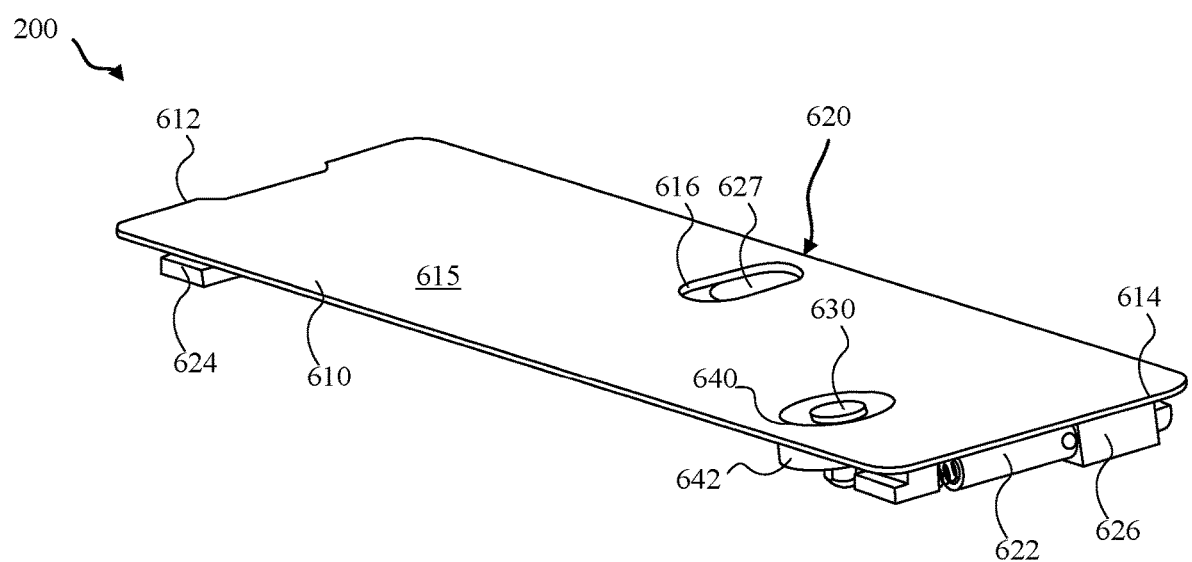
FIG. 6 illustrates an in-floor adapter for use in a reconfigurable cargo handling system, in accordance with various embodiments.

Referring now to FIG. 6, a perspective view of the in-floor adapter 200 from FIG. 3 is illustrated, in accordance with various embodiments. In various embodiments, the in-floor adapter 200 may be configured to replace a tray in accordance with tray 500 from FIG. 5 to convert a reconfigurable cargo handling system 100 from a cargo handling configuration to a configuration for transporting people. In various embodiments, the in-floor adapter comprises a plate 610 extending from a proximal end 612 to a distal end 614. The plate 610 comprises a flat surface 615. In various embodiments, the flat surface 615 and the cargo deck 102 from FIGS. 2 and 3 may form a substantially flat surface of the cargo deck 102.

In various embodiments, the in-floor adapter 200 further comprises an attachment mechanism 620. The attachment mechanism 620 may comprise a first spring loaded plunger 622, a second spring loaded plunger 624. The first spring loaded plunger 622 and the second spring loaded plunger 624 may be configured to reduce in length in response to translating in a first direction. In this regard, the first spring loaded plunger 622 and the second spring loaded plunger 624 may reduce in length during installation and engage the cargo deck upon releasing the first spring loaded plunger 622 and the second spring loaded plunger 624.

In various embodiments, the first spring loaded plunger 622 and the second spring loaded plunger 624 may be coupled together by a bar 626 extending from a location proximate the proximal end 612 of the plate 610 to a location proximate the distal end 614 of the plate 610. In various embodiments, the bar 626 may include an aperture 627 extending through the bar. In various embodiments, the aperture 627 may be aligned with a slot 616 disposed through the plate 610. In this regard, to compress the spring loaded plungers 622, 624, an element (e.g., a finger or a tool) may be disposed through the slot 616 and the aperture 627 and the element may be pulled in a direction defined by the slot. In this regard, in various embodiments, the in-floor adapter 200 may be easily installed in a cargo deck and replace a roller tray (e.g., tray 500 from FIG. 5).

In various embodiments, the in-floor adapter 200 further comprises a fitting 630 disposed in and coupled to a pocket 640 extending below the plate 610. In various embodiments, the pocket may have a sidewall 642 and a bottom plate. In various embodiments, the fitting may be coupled to the pocket 640 by any method known in the art, such as a fastener, or the like.

Figure 7A:
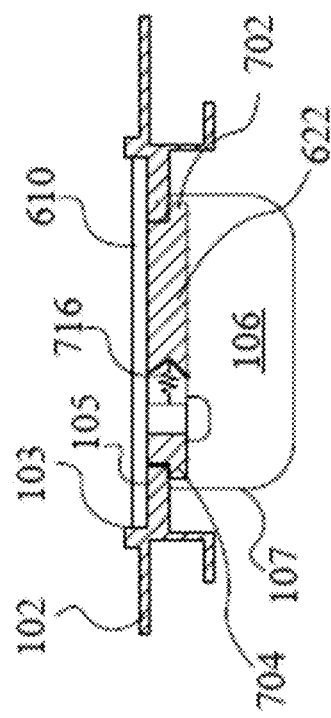
FIG. 7A illustrates a cross-sectional view of a portion of a cargo deck, in accordance with various embodiments.
Figure 7B:
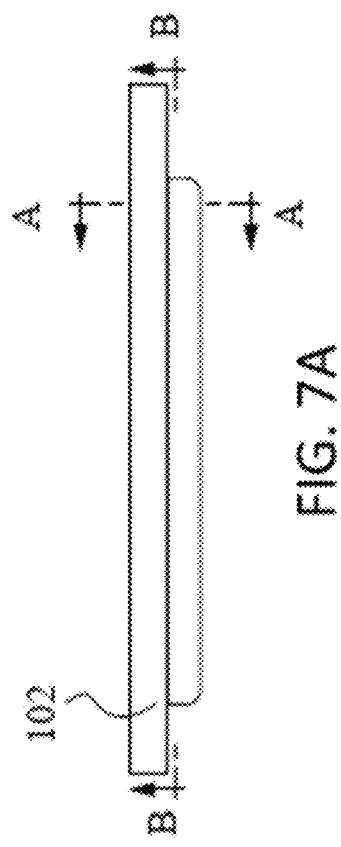
FIG. 7B illustrates a cross-sectional view of the cargo deck of FIG. 7A along section line A-A, in accordance with various embodiments.

Referring now to FIG. 7A, cross-sectional view of a portion of a cargo deck 102, in accordance with various embodiments, is illustrated. Referring not to FIG. 7B, a cross sectional view of the cargo deck 102 from FIG. 7A along section line A-A is illustrated, in accordance with various embodiments. In various embodiments, the cargo deck 102 comprises a recess 103 configured to receive the in-floor adapter 200 from FIG. 6. In various embodiments, the recess 103 includes a flange extending inward from the recess 103 past a side wall 107 of a cavity 106. In various embodiments, the first plunger 622 comprises a first flange 702 disposed on a first end of the first plunger 622 and a second flange 704 disposed on a second end of the first plunger 622. In various embodiments, the first flange 702 defines a shoulder which engages the flange 105 of the cargo deck upon installation. Similarly, in various embodiments, the second flange 704 defines a shoulder which engages the flange 105 of the cargo deck 102 on an opposite side. In various embodiments, the first plunger 622 includes a spring 716 extending from a portion of the first plunger 622 to a structure 705 coupled to the plate 610 of the in-floor adapter. In this regard, the structure 705 is fixed relative to the first plunger 622.

Figure 7C:
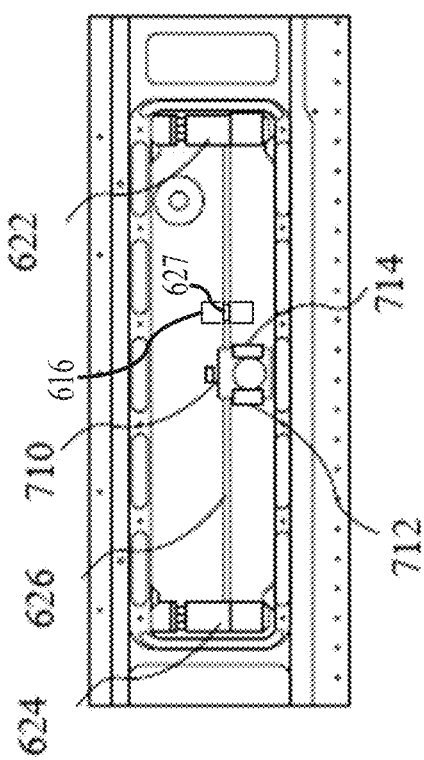
FIG. 7C illustrates a cross-sectional view of the cargo deck of FIG. 7A along section line B-B, in accordance with various embodiments.

Referring now to FIG. 7C, a cross-sectional view of cargo deck 102 from FIG. 7A along section line B-B is illustrated, in accordance with various embodiments. In various embodiments, the bar 626 extends from the first plunger 622 to the second plunger 624. In various embodiments, the bar 626 includes a body portion 710 disposed proximate a center portion of the plate 610. The body portion 710 may be restrained in a longitudinal direction by tabs 712 and 714 extending from the plate 610. In this regard, the body portion 710 may only translate in a lateral direction.

Figure 8A:
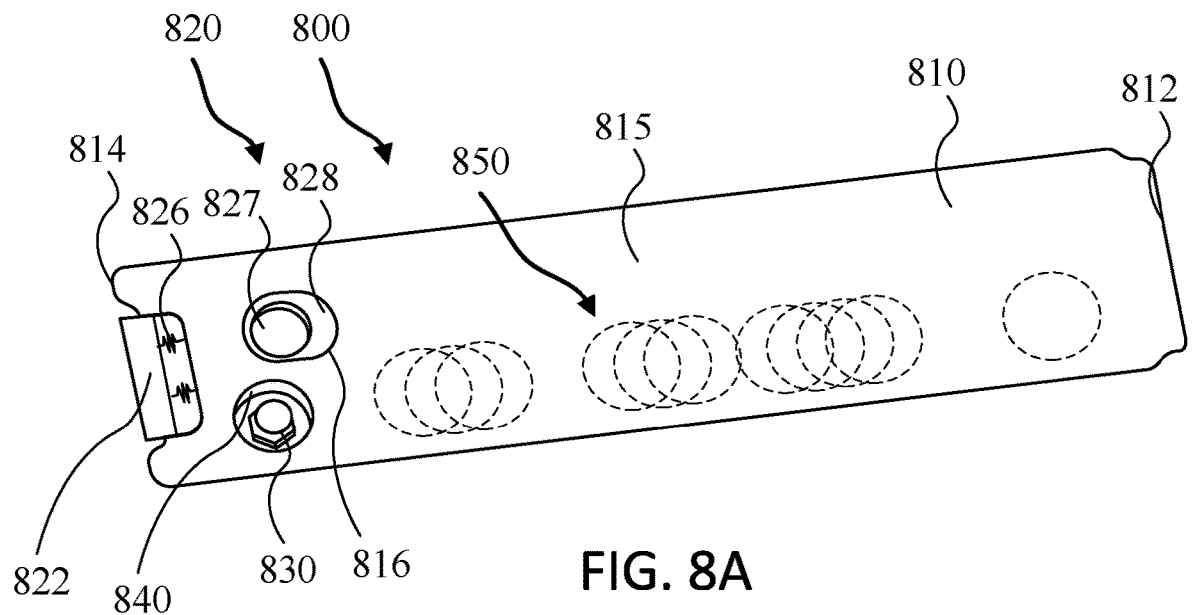
FIG. 8A illustrates a dual-purpose in-floor adapter in a mounting configuration, in accordance with various embodiments.
Figure 8B:
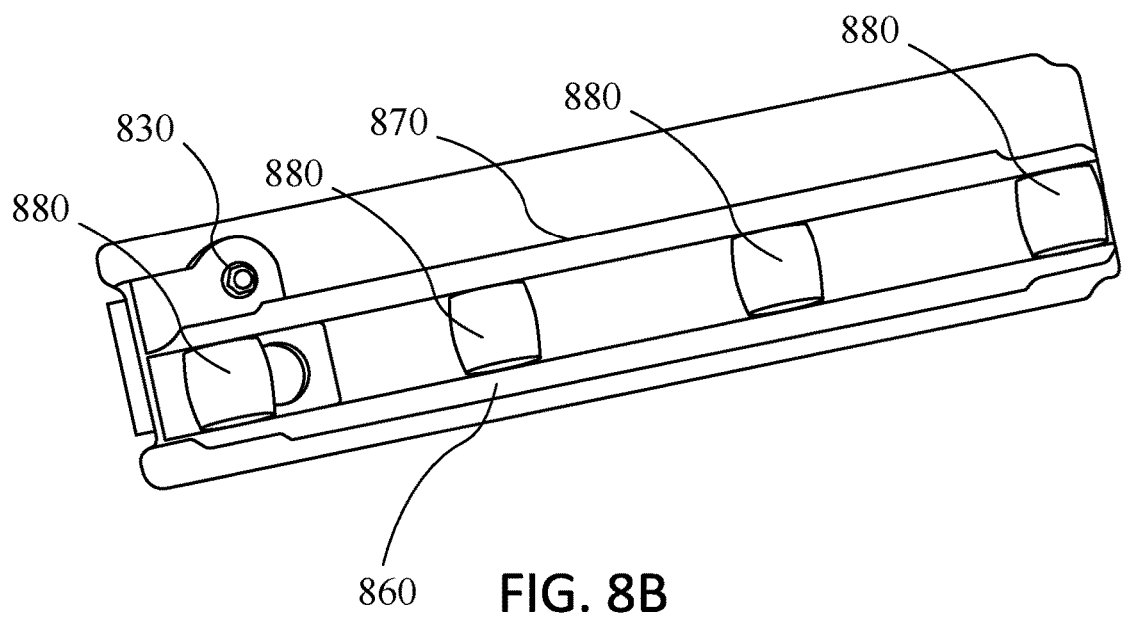
FIG. 8B illustrates the dual-purpose in-floor adapter of FIG. 8A in a cargo handling configuration, in accordance with various embodiments.

Referring now to FIG. 8A, a top perspective view of a dual purpose in-floor adapter 800, in accordance with various embodiments, is illustrated. In various embodiments, the dual purpose in-floor adapter 800 may be configurable for a cargo handling configuration and configurable for a transportation of people configuration. In this regard, FIG. 8A illustrates a transportation of people configuration and FIG. 8B illustrates a cargo handling configuration. In various embodiments, the in-floor adapter 800 includes a plate 810 having a flat surface 815 and extending from a proximal end 812 to a distal end 814. In various embodiments, the in-floor adapter further comprises an attachment mechanism 820 (e.g., a plunger 822) disposed at the distal end 814 of the in-floor adapter. The plunger 822 may include a flange 824 and be spring loaded (e.g., springs 826 may extend from the flange 824 to the plate 810. The plunger 822 may include an aperture 827 disposed through a body portion 828 and aligned with a slot 816 disposed through the plate 810. In various embodiments, the slot 816 may provide guidance for translating the body portion of the plunger 822. In various embodiments, the in-floor adapter includes a fitting 830 disposed in a pocket 840 in a manner similar to the fitting 830 from the in-floor adapter 200. In various embodiments, the fitting 830 may be installed in various other locations 850 based on an interface with a respective seat in the row of seats 130 from FIG. 2. In various embodiments, in-floor adapters may have multiple fittings. In various embodiments, the in-floor adapter 800 may be mistake proofed by any method known in the art, such as stenciling, keying features, or the like.

Referring now to FIG. 8B, the dual purpose in-floor adapter 800 in a cargo handling configuration is illustrated, in accordance with various embodiments. In various embodiments, the in-floor adapter 800 further comprises a first rail 860 and a second rail 870 extending longitudinally from the proximal end 812 to the distal end 814 of the plate 810. In various embodiments, the first rail 860 and the second rail 870 may each extend orthogonally from the plate 810 away from a surface opposite the flat surface 815. In various embodiments, the second rail 870 may be disposed laterally between the fitting 830 and the first rail 860.

In various embodiments, the in-floor adapter 800 further comprises a plurality of rollers 880 extending laterally from the first rail 860 to the second rail 870. The plurality of rollers 880 may be configured to translate cargo in the longitudinal direction. In various embodiments, the in-floor adapter 800 may provide a benefit in having a single component configurable for both a cargo handling configuration and a transportation of people configuration. However, the in-floor adapter 800 may be a greater weight relative to the in-floor adapter 200 from FIG. 6. In this regard, although in-floor adapter 800 has a dual purpose, the in-floor adapter 200 provides less weight for a transportation of people, in accordance with various embodiments.

Figure 9:
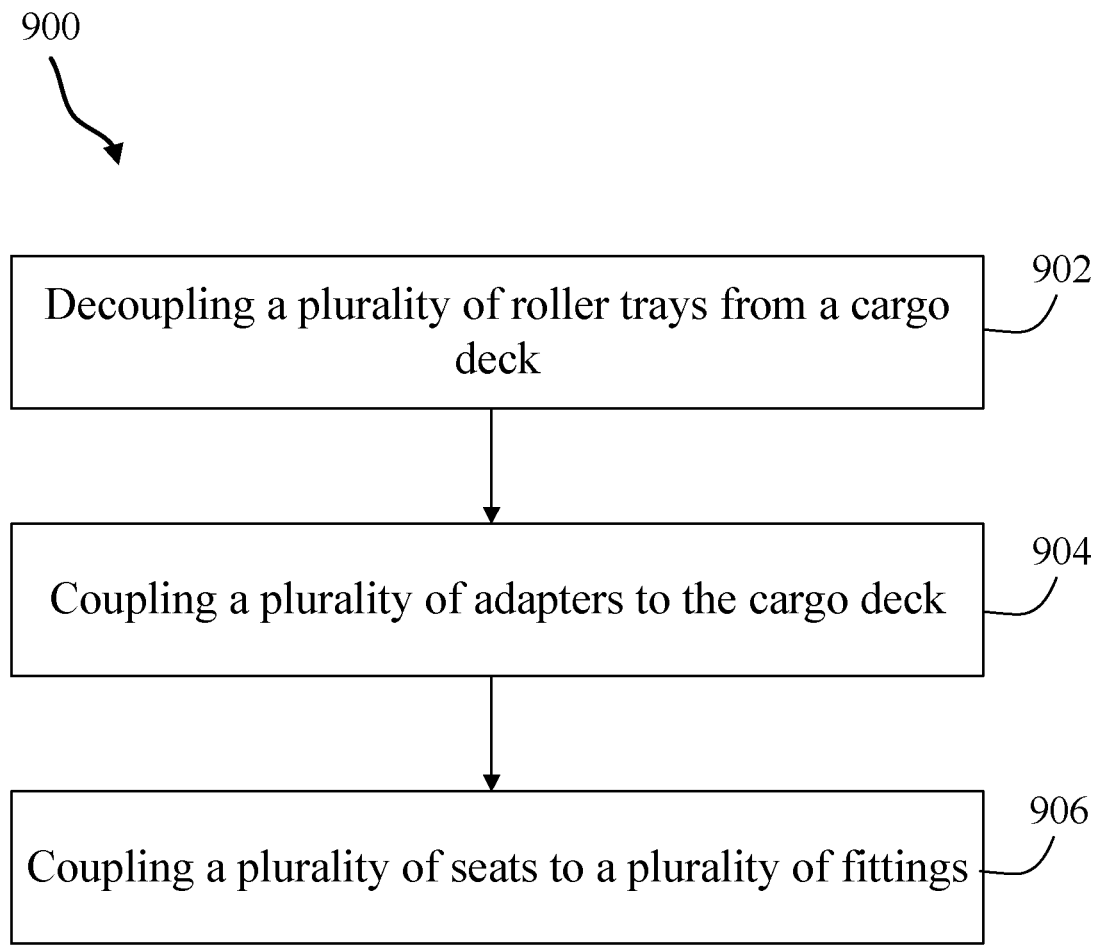
FIG. 9 illustrates a method of converting a reconfigurable cargo handling system from a cargo handling configuration to a transportation of people configuration, in accordance with various embodiments.

Referring now to FIG. 9, a method 900 of converting a reconfigurable cargo handling system from a cargo handling configuration to a configuration for transporting people is illustrated, in accordance with various embodiments. The method comprises decoupling a plurality of roller trays from a cargo deck (step 902). The plurality of roller trays may be disposed in a first row on a first outboard side, in a second row on a second outboard side opposite the first outboard side, and in a third row disposed between the first row and the second row.

In various embodiments, the method 900 further comprises coupling a plurality of adapters to the cargo deck (step 904). In various embodiments, each adapter in the plurality of adapters may include a plate with a flat surface, the plate configured to engage a flange of the cargo deck. In various embodiments, each adapter may comprise a respective roller tray in an alternate configuration (e.g., adapter 400 combined with tray 500 or dual purpose in-floor adapter 800 in the configuration for the transportation of people).

In various embodiments, the method 900 further comprises coupling a plurality of seats to a plurality of fittings (step 906). In various embodiments, legs of each seat in the plurality of seats may be mounted to a plurality of fittings. In various embodiments, the plurality of fitting include a first row of integral fittings disposed proximate a first outboard end, a second row of integral fitting disposed proximate a second outboard end, a third row of integral fittings disposed between the first row of integral fittings and the second row of integral fittings, and a fourth row of fittings disposed between the first row of integral fitting and the third row of integral fittings. In various embodiments, an "integral fitting" as disclosed herein, refers to a fitting that is fixed to the cargo deck in both a cargo handling configuration and a transportation of people configuration. In various embodiments, the fourth row of fittings includes a set of integral fittings and a set of fittings coupled to adapters in the plurality of adapters.

In various embodiments, the reconfigurable cargo handling system as disclosed herein provides the benefit of being reconfigurable from a cargo handling configuration to a transportation of people configuration and vice versa.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An in-floor adapter for a cargo deck of a cargo handling system, the in-floor adapter comprising:
    a plate extending from a proximal end to a distal end;
    a pocket disposed in the plate, the pocket having a sidewall and a bottom wall;
    a fitting disposed in the pocket, the fitting configured to mount a leg of a seat;
    an attachment mechanism, the attachment mechanism configured to engage the cargo deck; and
    a slot disposed through the plate, the slot configured to guide operation of the attachment mechanism during installation of the in-floor adapter in the cargo deck,
    wherein the attachment mechanism comprises a first spring-loaded plunger and a second spring loaded plunger,
    wherein the attachment mechanism further comprises a bar extending between and coupled to the first spring loaded plunger and the second spring loaded plunger, and
    wherein the bar is configured to be accessed via the slot and pulled to compress the first spring loaded plunger and the second spring loaded plunger.

2. The in-floor adapter of claim 1, wherein the first spring loaded plunger is disposed proximate the proximal end of the plate, and wherein the second spring loaded plunger is disposed proximate the distal end of the plate.

3. The in-floor adapter of claim 1, further comprising:
    an aperture disposed through the bar, the aperture aligned with the slot, such that an element may be inserted through the slot and the aperture so as to pull the bar thereby actuating the first spring loaded plunger and the second spring loaded plunger and releasing the in-floor adapter.

* * * * *